United States Patent [19]

Kako

[11] Patent Number: 5,002,031

[45] Date of Patent: Mar. 26, 1991

[54] FUEL CONTROL APPARATUS FOR AN INTERNAL-COMBUSTION ENGINE

[75] Inventor: Hajime Kako, Himeji, Japan

[73] Assignee: Mitsubishi Denki Kabushiki Kaisha, Tokyo, Japan

[21] Appl. No.: 520,949

[22] Filed: May 9, 1990

[30] Foreign Application Priority Data

May 17, 1989 [JP] Japan ................................. 1-23334
May 22, 1989 [JP] Japan ................................. 1-29260

[51] Int. Cl.$^5$ ..................... F02M 25/07; F02M 51/00; F02D 41/04
[52] U.S. Cl. ................................. 123/486; 123/488; 123/478; 123/571
[58] Field of Search ............... 123/478, 480, 486, 488, 123/494, 568, 569, 571

[56] References Cited

U.S. PATENT DOCUMENTS

| | | | |
|---|---|---|---|
| 4,461,263 | 7/1984 | Hasegawa | 123/571 |
| 4,553,518 | 11/1985 | Takao et al. | 123/571 |
| 4,598,684 | 7/1986 | Kato et al. | 123/571 |
| 4,782,810 | 11/1988 | Shimoda et al. | 123/571 |
| 4,848,303 | 7/1989 | Fujimoto et al. | 123/571 |
| 4,881,509 | 11/1989 | Ohashi et al. | 123/571 |
| 4,938,198 | 7/1990 | Suzuki | 123/571 |
| 4,947,820 | 8/1990 | Kushi | 123/571 |

FOREIGN PATENT DOCUMENTS 50-00214 1/1975 Japan .

Primary Examiner—Willis R. Wolfe
Attorney, Agent, or Firm—Sughrue, Mion, Zinn, Macpeak and Seas

[57] ABSTRACT

A fuel control apparatus for an internal-combustion engine, capable of accurately determining fuel injection quantity according to exhaust gas recirculation rate regardless of bypass air flow rate and the atmospheric pressure. The fuel control apparatus comprises exhaust gas recirculation control means for controlling the rate of recirculation of the exhaust gas to the intake system according to negative pressure varying with the opening of the throttle valve of the engine, coefficient calculating means for determining, according to the current operating condition of the engine, a first coefficient for calculating fuel injection quantity for an exhaust gas recirculation stop mode in which the exhaust gas is not recirculated and second coefficient for calculating fuel injection quantity for an exhaust gas recirculation mode in which the exhaust gas is recirculated, and fuel injection quantity calculating means for calculating fuel injection quantity by using first and second corrected coefficients obtained by correcting the first and second coefficients according to the opening of the throttle valve, and parameters representing the operating condition of the engine.

6 Claims, 8 Drawing Sheets

(A)

(B)

FUEL CONTROL APPARATUS FOR AN INTERNAL-COMBUSTION ENGINE

BACKGROUND OF THE INVENTION

1. Field of the Invention

The present invention relates to a fuel control apparatus for an internal-combustion engine (hereinafter, referred to simply as "engine") and, more particularly, to a fuel control apparatus for an engine provided at least with an exhaust gas recirculation (hereinafter abbreviated to "EGR") equipment for supplying the exhaust gas to the intake system of the engine.

2. Discussion of Background

A conventional EGR equipment of an exhaust pressure control system mounted on an engine comprises an EGR control valve for controlling the exhaust gas recirculating ratio, and an exhaust gas transducer for operating the EGR control valve. The exhaust pressure transducer is operated by the exhaust pressure, which increases with the load on the engine. The exhaust pressure transducer opens a passage when the exhaust pressure decreases to introduce air into the EGR control valve. Thus, the opening of the EGR control valve is decreased with decrease in the load on the engine. Accordingly, the exhaust gas-recirculation ration (EGR ratio) $K_{EGR}$ (the ratio of the flow rate of the recirculated exhaust gas to the flow rate of intake air) can be maintained on a maximum level over a comparatively wide range of load, i.e., a comparatively wide range of the intake pipe pressure as indicated by solid lines in FIGS. 6(A) and 6(B).

A bypass air control valve is provided in a bypass intake passage bypassing a throttle valve to regulate the sectional area of the opening. The bypass air control valve controls the flow rate of air flowing through the bypass intake passage according to the operating mode of the air conditioner during idling, according to the variation of the throttle opening when the dashpot is necessary, and according to the deviation of the actual engine speed from a desired engine speed for controlling the idling speed.

The operation of a fuel control apparatus applied to such an engine will be described hereinafter with reference to FIG. 8. In steps S1, S2 and S3, engine speed, $N_E$, intake pipe pressure PB and throttle opening $\Theta$ are detected sequentially and data $N_e$, Pb and $\theta$ engine speed $N_E$, intake pipe pressure PB and throttle opening $\Theta$ are read. In step S4, a bypass air flow rate to be set by the bypass air control valve is calculated taking into consideration data representing the operating mode of the engine including engine speed $N_E$, throttle opening $\Theta$ and the status of the switch of the air conditioner. In step S5, volumetric efficiency $C_{EVW}(N_e, Pb)$ during the operation of the EGR system is determined by mapping a two-dimensional map indexed by the engine speed date $N_e$ and the intake pipe pressure data Pb. In step S6, a fuel injection valve driving time $\tau$ is calculated by using a formula: $\tau = K \times Pb \times C_{EVW}(N_e, Pb)$, where K is a constant. After step S6 has been completed, the operation returns to step S1, and the the foregoing steps are repeated.

Suppose that the EGR ratio for the engine speed data $N_e$ and the intake pipe pressure data Pb is $K_{EGR}(N_e, Pb)$, and the volumetric efficiency of the engine while the exhaust gas is not recirculated is $C_{EVWO}(N_e, Pb)$. Then, the volumetric efficiency $C_{EVW}(N_e, Pb)$ of the engine while the exhaust gas is recirculated is expressed by: $C_{EVW} = C_{EVWO} \times (1 - K_{EGR})$. Accordingly, The $C_{EVW}$ can be determined beforehand on the basis of $K_{EGR}$ and $C_{EVWO}$ determined experimentally for the engine speed data $N_e$ and the intake pipe pressure data Pb.

The conventional fuel control apparatus for an engine regulates the quantity of fuel to be injected according to the EGR ratio $K_{EGR}$ by using the volumetric efficiency $C_{EVW}$ for an operating state in which the exhaust gas is recirculated. However, since the EGR ratio $K_{EGR}$ is determined on an assumption that the atmospheric pressure is 1 atm and the bypass passage is closed, the volumetric efficiency $C_{EVW}$, which is dependent on the EGR ratio $K_{EGR}$ and is used for determining the fuel injection quantity, is determined without taking into consideration the variation of bypass air flow rate and that of the atmospheric pressure.

FIG. 6(A) is a graph showing the variation of EGR ratio $K_{EGR}$ with the intake pipe pressure data Pb for an operating mode in which the bypass passage is open (broken line) and an operating mode in which the bypass passage is closed (solid line) when the atmospheric pressure and the engine speed $N_E$ are fixed. Since the throttle opening decreases as the bypass air flow rate increases when the intake pipe pressure is fixed, the actual EGR ratio $K_{EGR}$ decreases, namely, the actual volumetric efficiency increases, so that air-fuel ratio increases, namely, the air-fuel mixture becomes lean.

FIG. 6(B) is a graph showing the variation of the EGR ratio $K_{EGR}$ with the intake pipe pressure data Pb for a low atmospheric pressure (alternate long and short dash line) and a high atmospheric pressure (solid line) when the engine speed $N_E$ is fixed. When the intake pipe pressure is fixed, the throttle opening under a low atmospheric pressure is greater than that under a high atmospheric pressure, and hence the actual EGR ratio $K_{EGR}$ increases, namely, the actual volumetric efficiency decreases. Accordingly, air-fuel ratio decreases, namely, the air-fuel mixture becomes rich under a relatively low atmospheric pressure.

The variation of the air-fuel ratio according to the variation of the bypass air flow rate or the variation of the atmospheric pressure deteriorates the quality of the exhaust gas and the performance of the engine.

The fuel control system for the engine equipped with such an EGR equipment of an exhaust pressure control apparatus executes fuel injection control operation as shown in FIG. 9. In FIG. 9, steps S21 to S24 are the same as steps S1 to S4 of FIG. 8 and hence the description thereof will be omitted.

In step S25, a volumetric efficiency $C_{EV}(N_e, Pb)$ for the engine speed data $N_e$ and the intake pipe pressure data Pb for a state in which the exhaust gas is not recirculated is determined by mapping a two-dimensional map. In step S26, an EGR ratio $K_{EGR}(N_e, Pb)$ for the engine speed data $N_e$ and the intake pipe pressure data Pb is determined by mapping. In step S27, a fuel injection valve driving time $\tau = K \times Pb \times C_{EV}(N_e, Pb) \times \{1 - K_{EGR}(N_e, Pb)\}$, where K is a constant. After the completion of step S27, he operation returns to step S21 to repeat these steps. Thus, this conventional fuel control apparatus regulates fuel injection quantity through the regulation of fuel injection valve driving time on the basis of the EGR ration $K_{EGR}$ in a state where the atmospheric pressure is 1 atm, and the engine speed and the intake pipe pressure in a state where the bypass passage is closed, and does not take into consideration bypass air flow rate and the variation of the atmospheric pressure.

SUMMARY OF THE INVENTION

Accordingly, it is an object of the present invention to provide a fuel control apparatus for an engine, capable of accurately determining fuel injection quantity according to EGR rate regardless of bypass air flow rate and the atmospheric pressure.

It is another object of the present invention to provide a fuel control apparatus for an engine, capable of correcting fuel injection quantity corresponding to an EGR ratio approximately equal to an actual EGR ratio.

In one aspect of the present invention, a fuel control apparatus for an engine comprises EGR control means for controlling the rate of recirculation of the exhaust gas to the intake system according to negative pressure varying with the opening of the throttle valve of the engine; coefficient calculating means for determining, according to the current operating condition of the engine, a first coefficient for calculating fuel injection quantity for calculating fuel injection quantity for the operation of the engine in an EGR stop mode in which the exhaust gas is not recirculated and a second coefficient for calculating fuel injection quantity for the operation of the engine in an EGR mode in which the exhaust gas is recirculated; and fuel injection quantity calculating means for calculating fuel injection quantity on the basis of first and second corrected coefficients obtained by correcting the first and second coefficients according to the opening of the throttle valve, and parameters representing the current operating mode of the engine.

In another aspect of the present invention, a fuel control apparatus for an engine comprises EGR control means for controlling the rate of supply of the exhaust gas to the intake system according to negative pressure varying with the opening of the throttle valve; first calculating means for correcting a given EGR ratio corresponding to an operating mode of the engine with reference to the opening of the throttle valve; and second calculating means for calculating fuel injection quantity by using the corrected EGR ratio and parameters representing the operating condition of the engine.

DETAILED DESCRIPTION OF THE PREFERRED EMBODIMENTS

Figure 1:
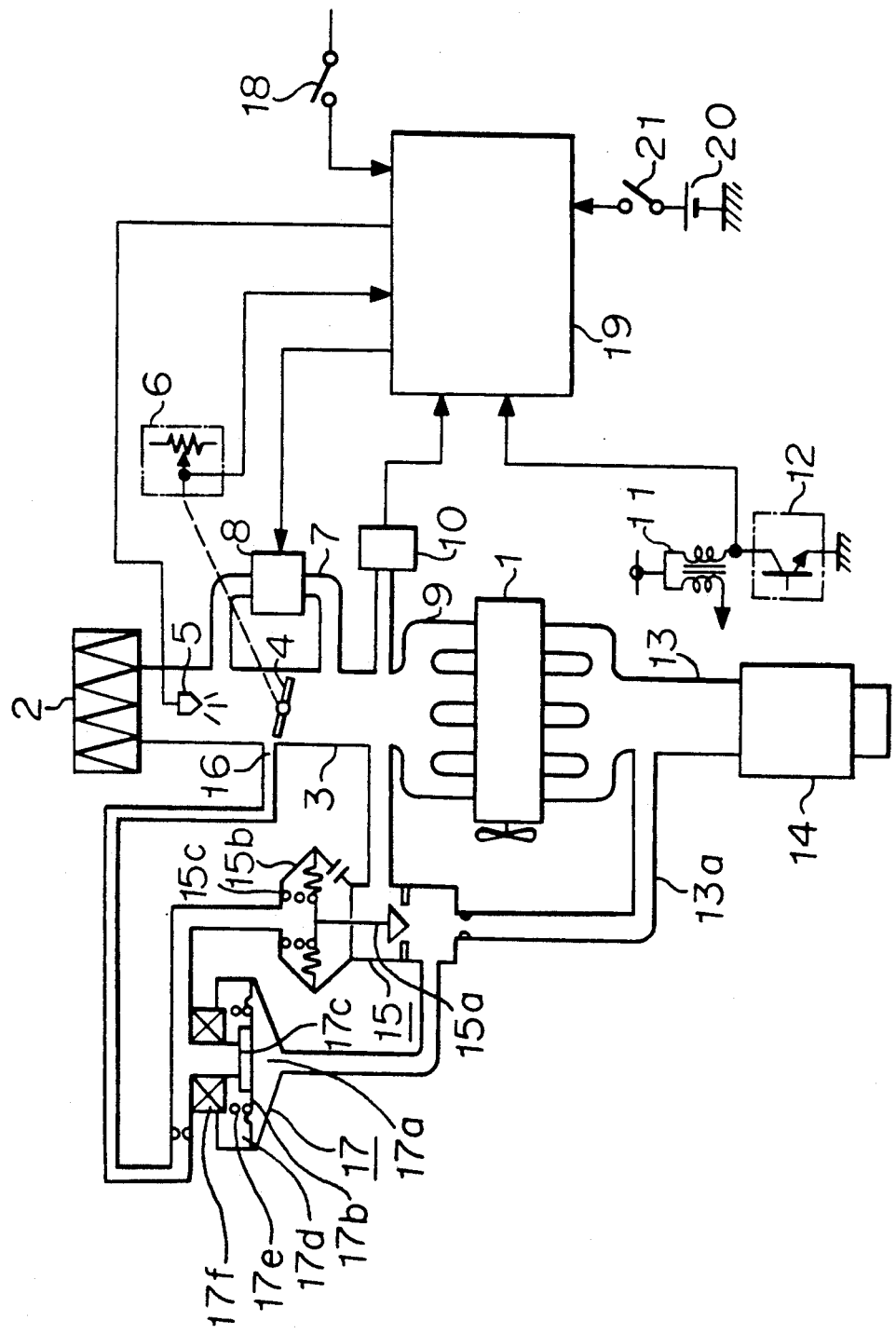
FIG. 1 is a block diagram of a fuel control apparatus in a first embodiment according to the present invention.

Referring to FIG. 1, a well-known 4-cycle spark-ignition internal-combustion engine (hereinafter, referred to simply as "engine") 1 sucks air for combustion principally through an air cleaner 2, an intake pipe 3 and a throttle valve 4. Fuel supplied by a fuel supply system, not shown, is injected into the intake pipe 3 by an injector 5 disposed within the intake pipe 3 before the throttle valve 4 with respect to the direction of flow of air. A throttle valve opening detector 6 detects the throttle valve opening $\Theta$ and provides a signal representing the throttle valve opening $\Theta$. A bypass air passage 7 is connected to the intake pipe 3 so as to bypass the throttle valve 4. A bypass air control valve 8 is provided in the bypass air passage to regulate the sectional area of the bypass air passage 7. The bypass air control valve 8 opens to the bypass air passage 7 to supply air for combustion to the engine 1 through the bypass air passage 7. A pressure sensor 10 detects the absolute pressure PB in the intake pipe 3 at the inlet of a manifold 9 connected to the outlet of the intake pipe 3, and provides a signal representing the intake pipe pressure PB. An ignition coil 11 has a primary winding connected to a power supply and the last transistor of an igniter 12, and a secondary winding for applying a high voltage to ignition plugs, not shown, provided in the cylinders, respectively, of the engine 1.

At least part of the exhaust gas of the engine 1 is discharged through an exhaust pipe 13 and a catalytic converter 14. Part of the exhaust gas branched from the exhaust pipe 13 into a branch exhaust pipe 13a flows into the intake pipe 3 through an EGR control valve 15 and a pipe having one end connected to the EGR control valve 15 and the other end connected to the intake pipe 3 at a position after the bypass air passage 7 and is returned to the engine 1. An EGR negative pressure port 16 is formed in the intake pipe 3 at a position slightly before the valve element of the throttle valve 4 at a fully closed position. Naturally, the EGR negative pressure port 16 is positioned between the junctions of the bypass air passage 7 and the intake pipe 3. A negative pressure $P_{EGR}$ at the EGR negative pressure port 16 and the exhaust gas pressure in the branch exhaust pipe 13a are applied to an exhaust gas transducer 17. The exhaust gas pressure transducer 17 applies the negative pressure $P_{EGR}$ or the atmospheric pressure to the EGR control valve 15 depending on the condition of the input pressures. The EGR control valve 15 comprises a diaphragm valve element 15a, a casing having a vacuum chamber 15b, and a spring 15c. The exhaust gas pressure transducer 17 comprises a casing having an exhaust pressure chamber 17a and an atmospheric pressure chamber 17d, and provided with a port 17c connected to the EGR negative pressure port 16 and the vacuum chamber 15b, a diaphragm 17b partitioning the interior of the casing into the exhaust pressure chamber 17a and the atmospheric pressure chamber 17d, a spring 17e, and a filter 17f. The EGR control valve 15 and the exhaust gas pressure transducer 17 constitute an EGR equipment of an exhaust gas pressure control system.

Figure 4:
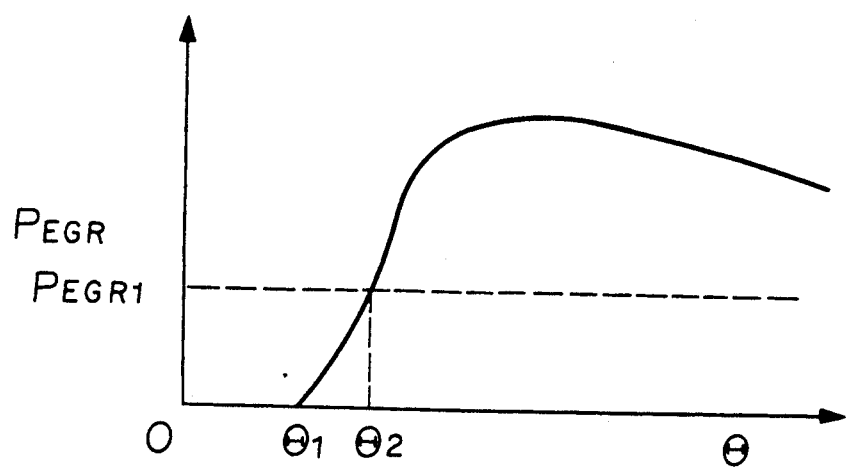
FIG. 4 is a graph showing the variation of the negative pressure in an EGR negative pressure port with the throttle valve opening.

FIG. 4 shows the relation between the throttle valve opening $\Theta$ of the throttle valve 4 measured on the horizontal axis, and the negative pressure $P_{EGR}$ at the EGR negative pressure port 16 measured on the vertical axis. This relation holds regardless of the atmospheric pressure and the opening of the bypass air control valve 8. Referring to FIG. 4, when the throttle valve 4 is opened gradually from a fully closed position to a fully open position, the position of the EGR negative pressure port 16 relative to the valve element of the throttle valve 4 varies gradually from a position before the valve element of the throttle valve 4 to a position after the valve element of the throttle valve 4. Consequently, the negative pressure $P_{EGR}$ at the EGR negative pressure port 16 starts rising at a throttle valve opening $\Theta_1$ and reaches an EGR control negative pressure $P_{EGR}1$ at a throttle valve opening $\Theta_2$ ($\Theta_2 > \Theta_1$). The negative pressure $P_{EGR}$ rises further as the throttle valve opening increases beyond the throttle valve opening $\Theta_2$ to a maximum value, and then the negative pressure $P_{EGR}$ decreases gradually to zero as the throttle valve opening increases further. The EGR control negative pressure $P_{EGR}1$ is a threshold pressure; the EGR control valve 15 opens at a duty cycle to increase the EGR ration $K_{EGR}$ to a maximum when the EGR negative pressure at the EGR negative pressure port 16 increases beyond the threshold pressure. The negative pressure $P_{EGR}$ at the EGR negative pressure port 16 varies from zero to $P_{EGR}1$ as the throttle valve opening varies from $\Theta_1$ to $\Theta_2$, and hence the EGR ratio $K_{EGR}$ varies from zero to a maximum.

Referring again to FIG. 1, the exhaust gas pressure transducer 17 connects the EGR negative pressure port 16 to the EGR control valve 15 when the exhaust gas pressure reaches a relatively high level. The exhaust gas pressure transducer 17 supplies the atmospheric pressure to the EGR control valve 15 when the exhaust gas pressure decreases to a relatively low level due to the sufficiently large opening of the EGR control valve 15. While the negative pressure $P_{EGR}$ is applied to the EGR control valve 15, the EGR control valve 15 opens at an opening corresponding to the negative pressure $P_{EGR}$ to return part of the exhaust gas to the engine 1. While the atmospheric pressure is applied to the EGR control valve 15, the EGR control valve 15 remains closed and hence no exhaust gas is returned to the engine 1. The exhaust gas pressure transducer 17 and the EGR control valve 15 repeats a series of steps of the foregoing operation when the negative pressure $P_{EGR}$ increases beyond, for example, the EGR control negative pressure $P_{EGR}1$ to maintain the EGR ration $K_{EGR}$ at the maximum.

An air conditioning switch 18 is closed to drive an air conditioner, not shown, by the engine 1, and is opened to stop the air conditioner. A control unit 19 is connected through a key switch 21 to a battery 20. The control unit 19 receives the output signals of the throttle valve opening detector 6, the pressure sensor 10 and the ignition coil 11, controls the air conditioner in response to the operation of the air conditioner switch 18, and controls the operation of the injection 5 and the bypass air control valve 8.

Figure 2:
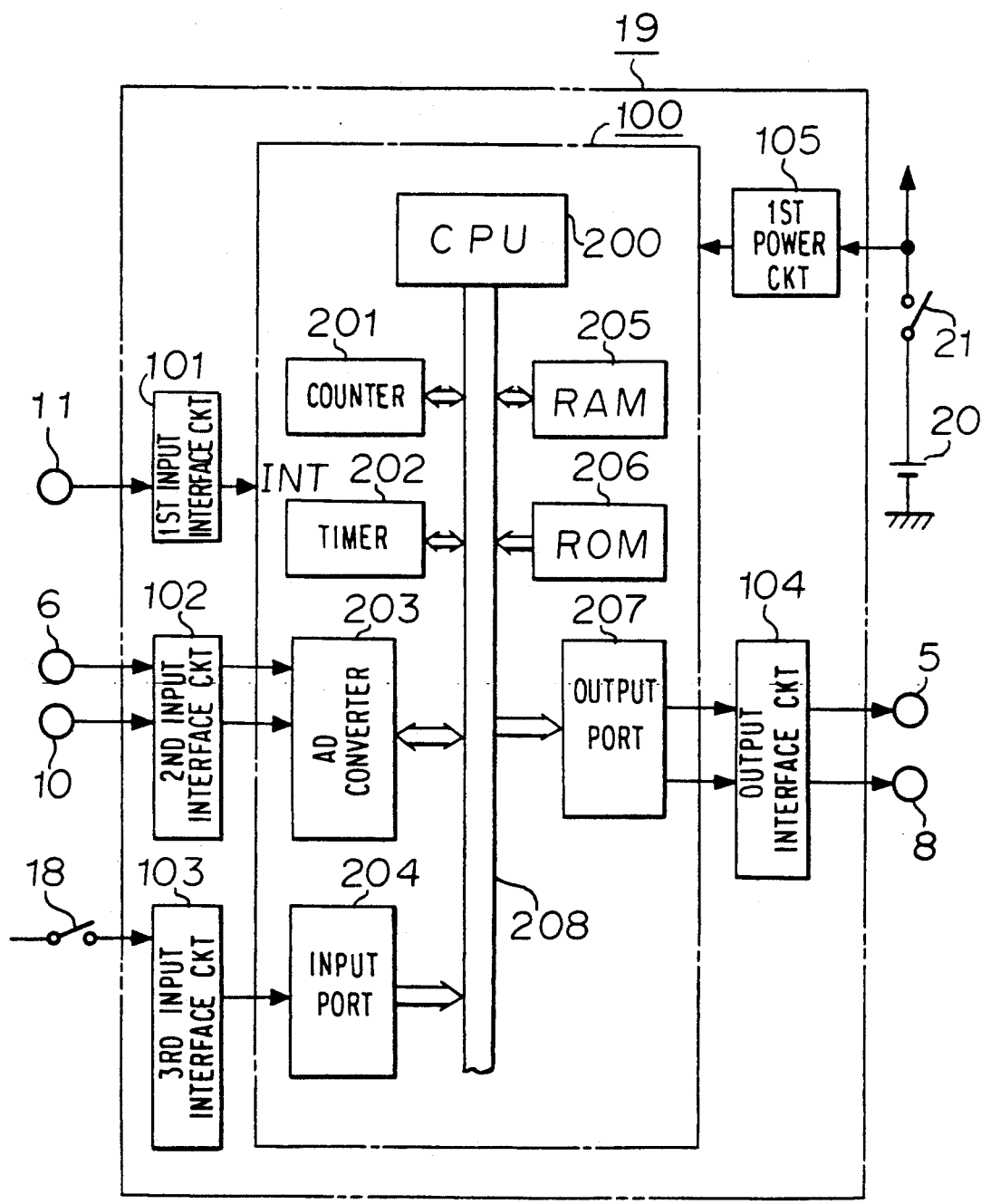
FIG. 2 is a block diagram of a control unit included in the fuel control apparatus of FIG. 1.
Figure 3:
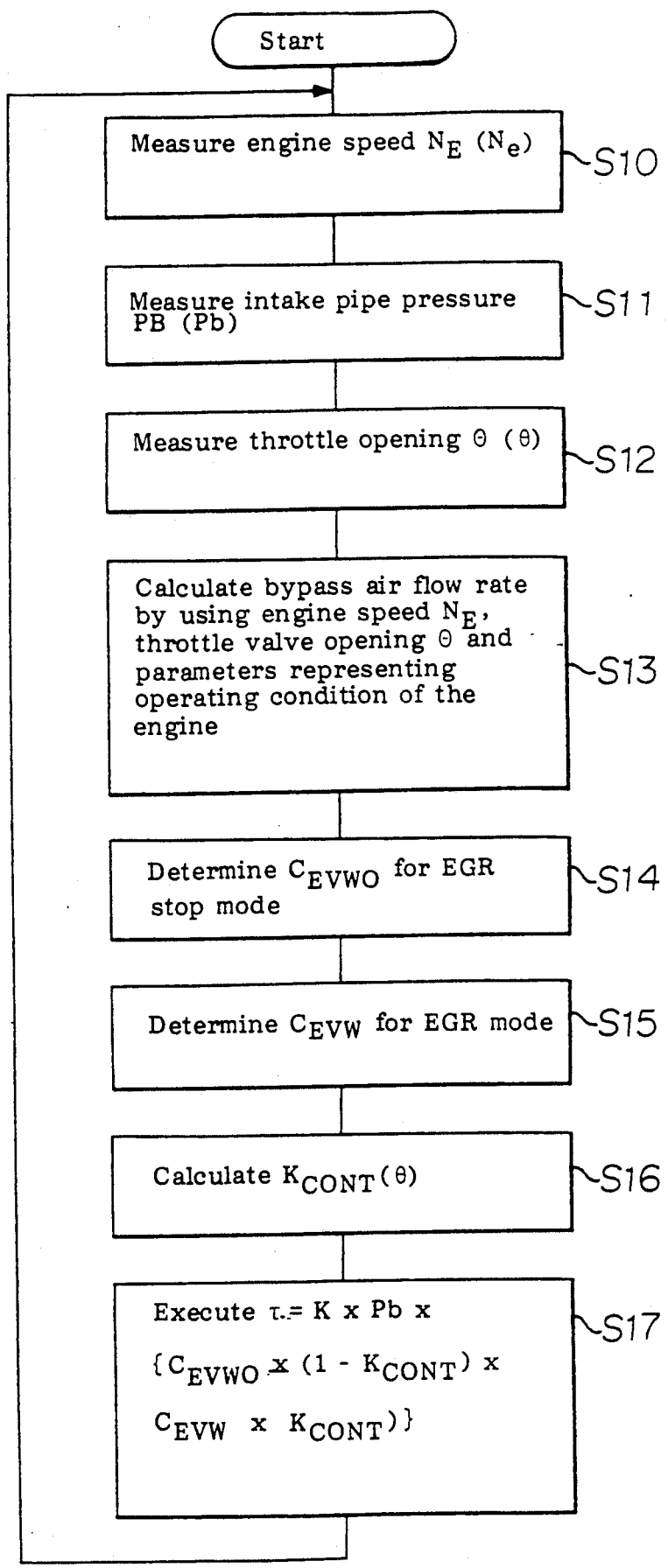
FIG. 3 is a flow chart of a control program to be executed by the fuel control apparatus of FIG. 1.

Referring to FIG. 2, showing the configuration of the control unit 19, a microcomputer 100 comprises a CPU 200 which executes various operations and decisions, a counter 201 for measuring the frequency of rotation, a timer 202 for controlling a driving time, an AD converter 203 for converting analog input signals into corresponding digital signals, an input port 204 for transferring digital signals to the CPU 200, a RAM 205 serving as a working storage, a ROM 206 storing control programs including a main program shown in FIG. 3, an output port 207 for sending out command signals provided by the CPU 200, and a common bus 208. An ignition signal provided by the primary winding of the ignition coil 11 is processed by a first input interface circuit 101 for, for example waveform shaping, and is applied to the microcomputer 100 as an interrupt command signal. Every time the microcomputer 100 receives the interrupt command signal, the CPU 200 reads the count registered by the counter 201 and calculates the frequency of rotation by using the difference between the successive counts, and then the microcomputer 100 calculates an engine speed data $N_e$ representing the engine speed $N_E$. A second input interface circuit 102 removes noise components from the analog output signals of the throttle valve opening detector 6 and the pressure sensor 10, amplifies the analog output signals, and then gives the amplified analog output signals to the AD converter 203. Then, the AD converter 203 converts the analog output signals into a digital throttle opening data $\theta$ representing the throttle opening $\Theta$ ($\theta$ is proportional to $\Theta$), and a digital intake pipe pressure data Pb representing the intake pipe pressure PB (Pb is proportional to PB). A third input interface circuit 103 converts the level of a signal representing the status of the air conditioner switch 18 into a digital level signal and applies the same to the input port 204. The CPU 200 calculates a bypass air flow rate and an injector driving time on the basis of the input data. The timer 202 measures a time corresponding to the calculated injector driving time in synchronism with the interrupt command signal. The CPU 200 gives a driving start signal and a driving end signal at the start of time measurement and at the end of time measurement, respectively, through the output port 207 to an output interface circuit 104. The output interface circuit 104 applies a driving signal to the injector 5 during a time interval between the driving start signal and the driving end signal to drive the injector 5 for fuel injection. The output interface circuit 104 applies a control signal to the bypass air control valve 8 to set the bypass air control valve 8 at an opening corresponding to the control signal. When the key switch 21 is closed, a first power circuit 105 connected to the battery 20 supplies a constant voltage to the microcomputer 100, and then the microcomputer 100 starts operating. The control unit 19 comprises the devices and circuits denoted by the reference numerals 100, 101, 102, 103, 104 and 105.

Figure 5:
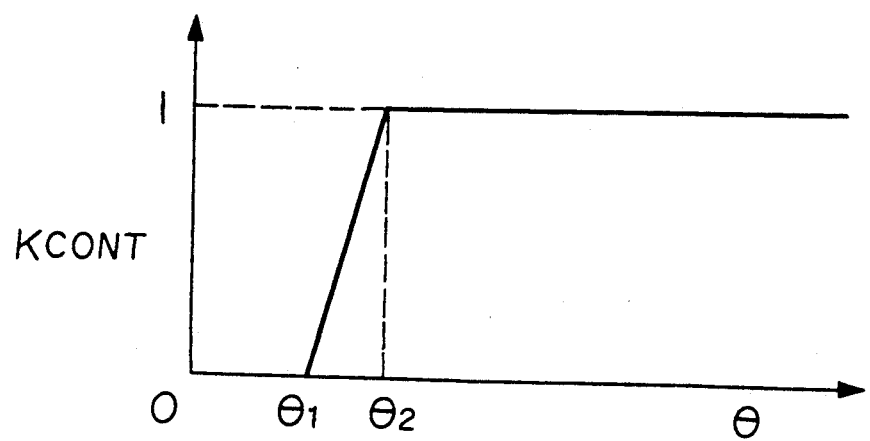
FIG. 5 is a graph showing the relation between throttle valve opening and EGR ratio correction factor.
Figure 6:
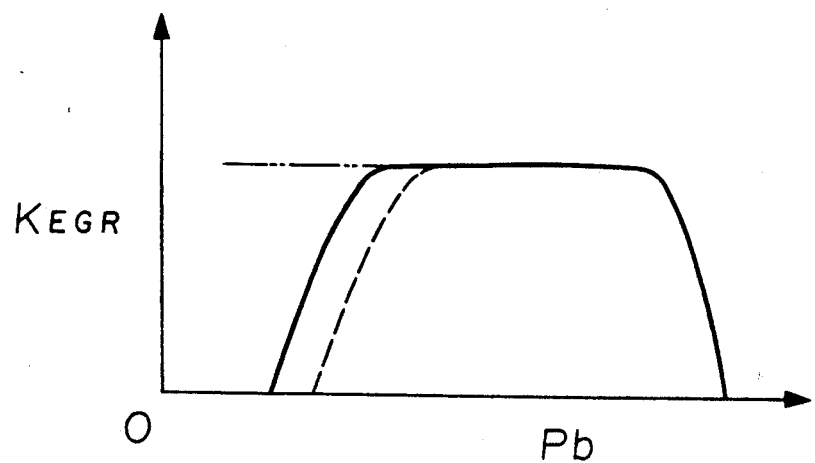
FIG. 6(A) and 6(B) are graphs showing the variation of EGR with intake pipe pressure during the operation of an engine controlled by a conventional fuel control apparatus.
Figure 6:
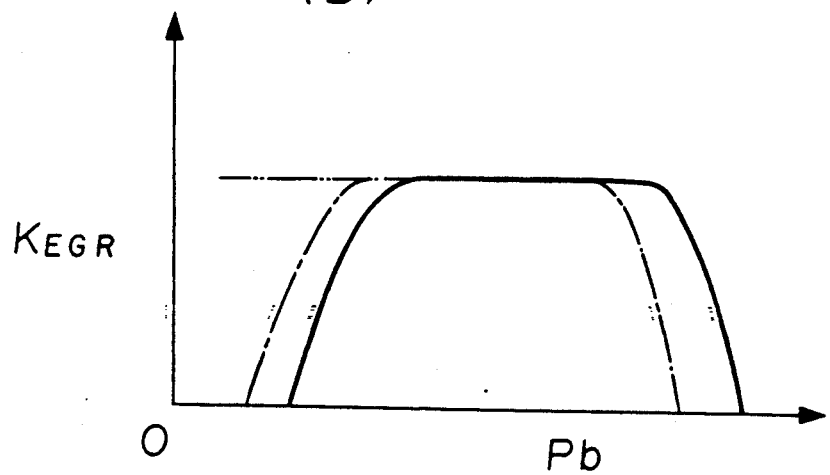

Two-dimensional maps of volumetric efficiencies $C_{EVWO}(N_e, Pb)$ of the engine 1 indexed by the engine speed data $N_e$ and the intake pipe pressure data Pb in an EGR stop mode, in which the exhaust gas is not recirculated, and volumetric efficiencies $C_{EVW}(N_e, Pb)$ of the engine 1 as a function of the engine speed data $N_e$ and the intake pipe pressure data Pb in an EGR mode, in which the exhaust gas is recirculated, are stored in the ROM 206. EGR ratios $K_{EGR}(N_e, Pb)$ for calculating the volumetric efficiencies $C_{EVW}(N_e, Pb)$ ($=C_{EVWO}(1-K_{EGR})$) are determined previously so that the EGR ratios $K_{EGR}(N_e, Pb)$ corresponding to actual EGR ratios $K_{EGR}$ in the leading edge of an EGR ratio curve are on a maximum level as indicated by alternate long and two short dashes lines in FIGS. 6(A) and 6(B) (on a maximum level at least after the throttle valve opening increases beyond the throttle valve opening $\Theta_1$). When throttle valve openings $\theta_1$ and $\theta_2$ correspond respectively to the throttle valve openings $\Theta_1$ and $\Theta_2$ shown in FIG. 4, EGR ratio correction coefficients $K_{CONT}$ respectively corresponding to throttle valve openings $\theta$ as shown in FIG. 5 are stored in the ROM 206. In FIG. 5, $K_{CONT}=0$ for $\theta \leq \theta_1$, $0 < K_{CONT} < 1$ for $\theta_1 < \theta < \theta_2$, and $K_{CONT}=1$ for $\theta_2 \leq \theta$.

The operation of the control unit 19, principally, the operation of the CPU 200, will be described hereinafter with reference to FIG. 3.

In step S10, an engine speed data $N_e$ representing the engine speed $N_E$ is calculated by using the measured frequency. In step S11, an intake pipe pressure data Pb representing the intake pipe pressure PB is obtained. In step S12, a throttle valve opening $\theta$ is obtained. in step S13, a control input for driving the bypass air control valve 8 according to the engine speed $N_E$, the throttle valve opening $\Theta$ and the status of the air conditioner switch 18 (FIG. 1) is calculated. In step S14, a volumetric efficiency $C_{EVWO}(N_e, Pb)$ for the engine speed data $N_e$ and the intake pipe pressure data Pb for the EGR to mode is determined by mapping the two-dimensional map. In step S15, a volumetric efficiency $C_{EVW}(N_e, Pb)$ for the engine speed data $N_e$ and the intake pipe pressure data Pb for the EGR mode is determined by mapping the two-dimensional map. In step S16, an EGR ratio correction coefficient $K_{CONT}(\theta)$ is determined for the measured throttle valve opening $\Theta$ by mapping the one-dimensional map (FIG. 5). In step S17, an injector driving time $\tau$ is calculated by substituting the constant K, the intake pipe pressure data Pb, the volumetric efficiency $C_{EVWO}$ for the EGR stop mode, the volumetric efficiency $C_{EVW}$ for the EGR mode, and the EGR ratio correction coefficient $K_{CONT}$ into a formula:
$\tau = K \times Pb \times \{C_{EVWO} \times (1 - K_{CONT}) + C_{EVW} \times K_{CONT}\}$.
After completing step S17, the operation returns to step S10, and then steps S10 to S17 are repeated.

The two-dimensional maps and the one-dimensional map employed for the fuel control operation by the foregoing embodiment may be substituted by functions to determined the factors by calculation.

Thus, the foregoing embodiment of the present invention determines fuel injection quantity of the basis of values obtained by interpolating the coefficients for the calculation of fuel injection quantity for both the EGR stop mode and the EGR mode at least including the volumetric efficiency according to the throttle valve opening, and parameters representing the operating condition of the engine. Therefore, fuel injection quantity can be calculated by using a volumetric efficiency approximate to a volumetric efficiency of an actual EGR mode regardless of the atmospheric pressure and the bypass air flow rate, and hence accurate air-fuel ratio control can be achieved to prevent the deterioration of the exhaust gas and the performance of the engine.

A fuel control apparatus in a second embodiment according to the present invention will be described hereinafter. Since the fuel control system in the second embodiment is substantially the same as the fuel control system in the first embodiment described previously with reference to FIGS. 1 and 2, only the functions and parts thereof different from those of the fuel control system in the first embodiment will be described with reference to FIGS. 1 and 2.

Referring to FIG. 2, two-dimensional maps of volumetric efficiencies $C_{EV}(N_e, Pb)$ for an EGR stop mode and EGR ratios $K_{EGR}(N_e, Pb)$, indexed by engine speed data $N_e$ and intake pipe pressure data Pb are stored beforehand in a ROM 206. EGR ratios $K_{EGR}(N_e, Pb)$, which vary with the intake pipe pressure data Pb for a fixed engine speed $N_E$, are determined previously so that the EGR ratios $K_{EGR}(N_e, Pb)$ corresponding to actual EGR ratios $K_{EGR}$ in the leading edge of an EGR ratio curve are on a maximum level as indicated by alternate long and two short dashes lines in FIGS. 6(A) and 6(B) (on a maximum level at least after the throttle valve opening increases beyond the throttle valve opening $\Theta_1$). When throttle valve openings $\theta_1$ and $\theta_2$ correspond respectively to the throttle valve openings $\Theta_1$ and $\Theta_2$ shown in FIG. 4, EGR ratio correction coefficients $K_{CONT}$ respectively corresponding to throttle valve openings $\theta$ as shown in FIG. 5 are stored in the ROM 206. In FIG. 5, $K_{CONT}=0$ when $\theta \leq \theta_1$, $0 < K_{CONT} < 1$ when $\theta_1 < \theta \leq \theta_2$, and $K_{CONT}=1$ when $\theta_2 < \theta$.

Figure 7:
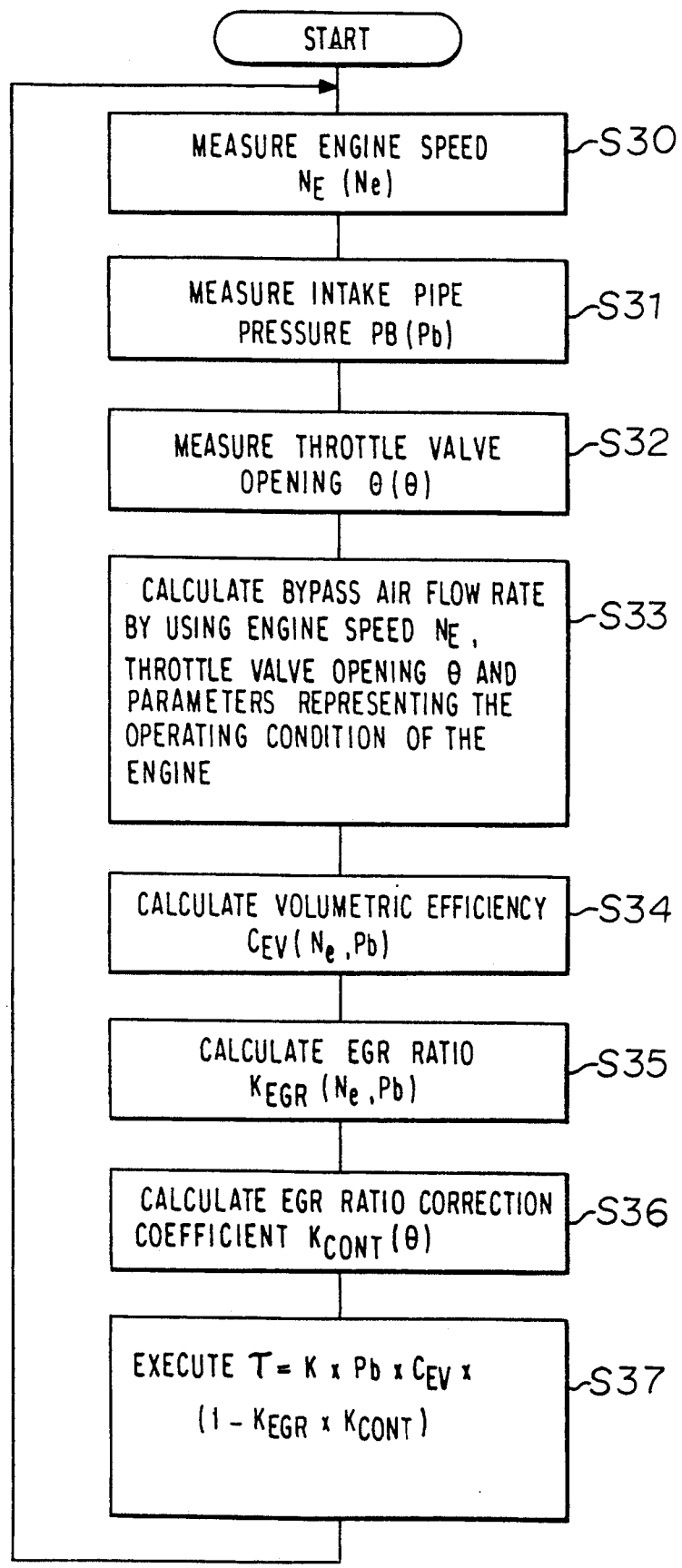
FIG. 7 is a flow chart of a control program to be executed by a fuel control apparatus in a second embodiment according to the present invention.
Figure 8:
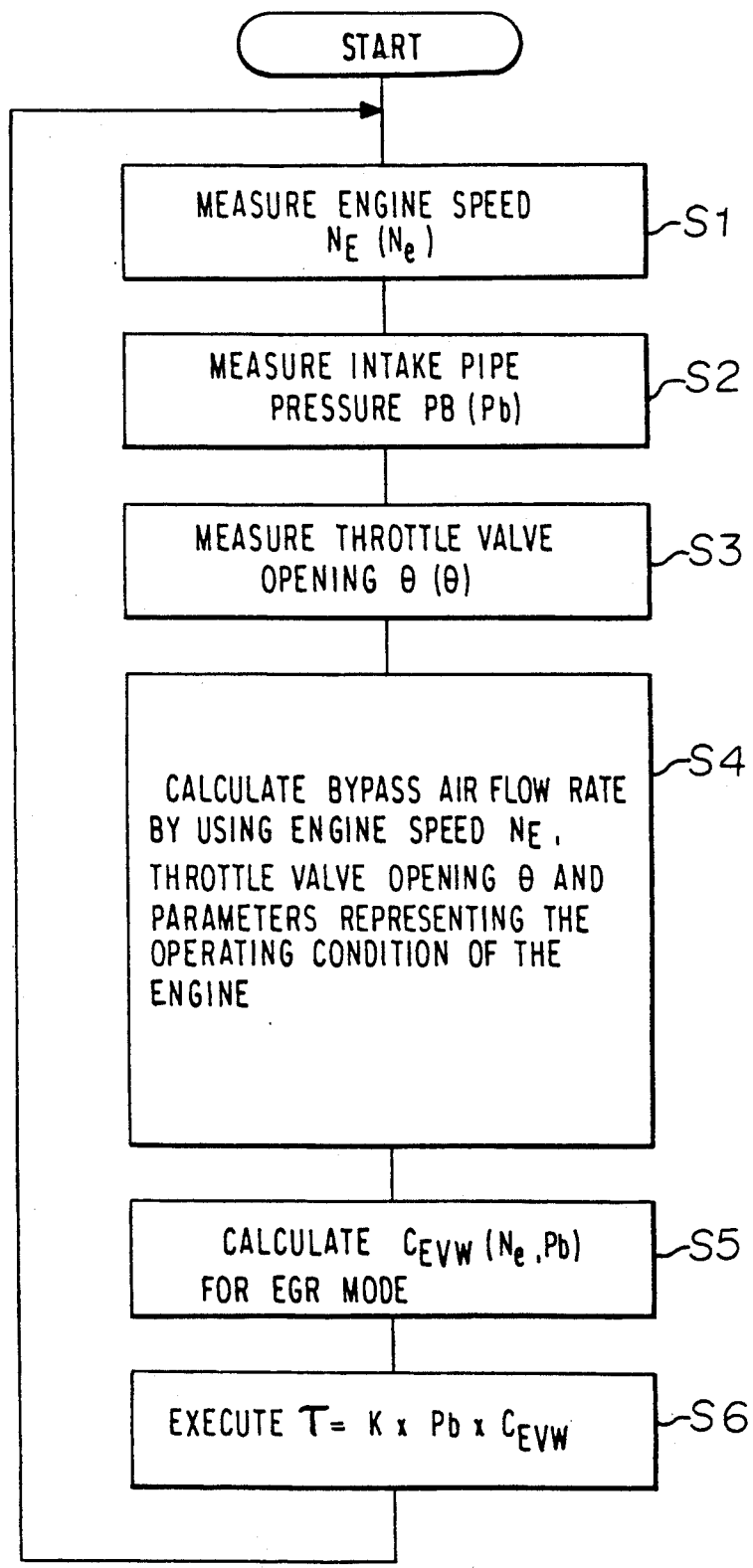
FIG. 8 is a flow chart of a control program to be executed by a conventional fuel control apparatus.
Figure 9:
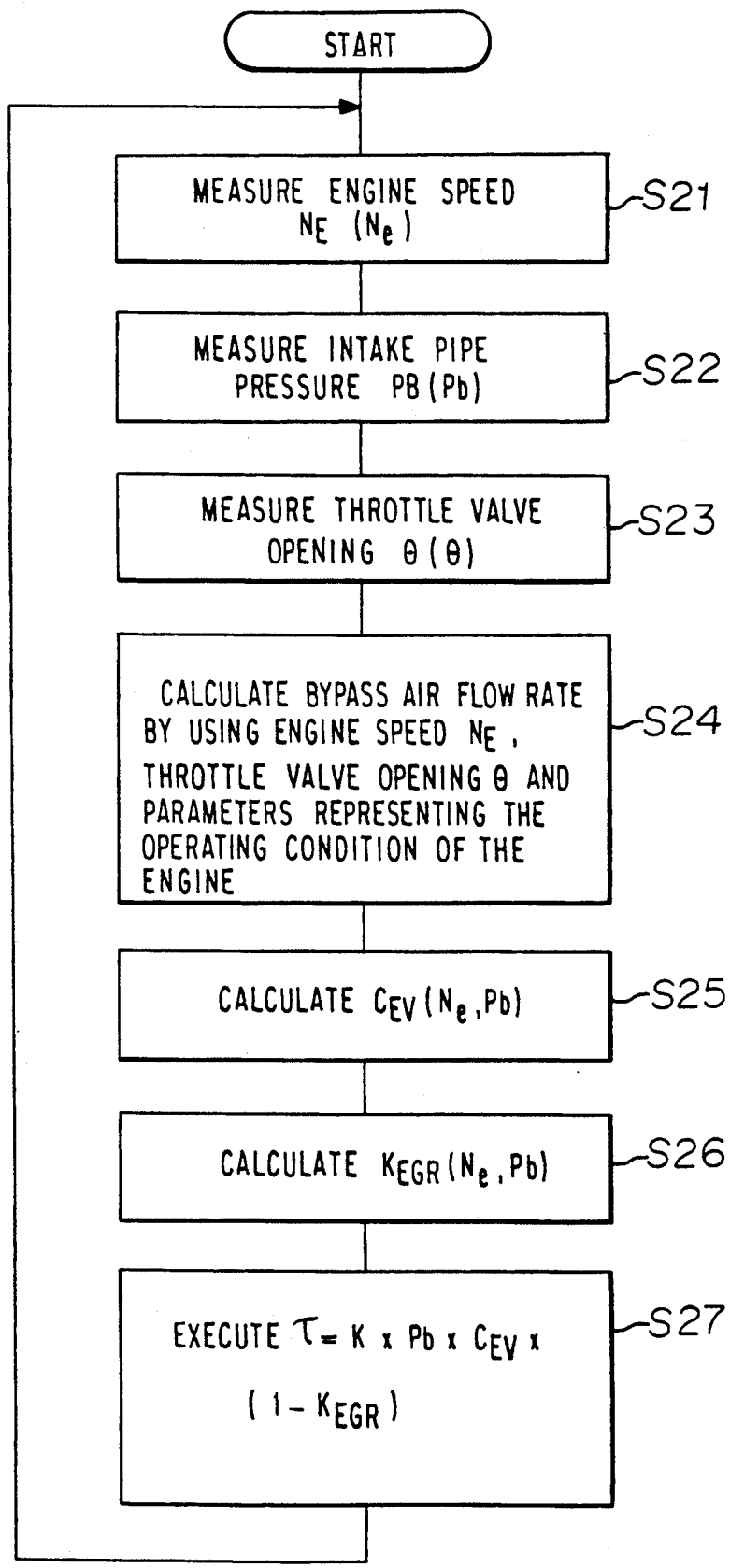
FIG. 9 is a flow chart of a control program to be executed by another conventional fuel control apparatus.

The operation of the fuel control apparatus in the second embodiment, principally, the operation of the CPU 200, will be described hereinafter with reference to FIG. 7, in which steps S30 to S33 are the same as steps S10 to S13 in FIG. 3, and hence the description thereof will be omitted.

In step S34, a volumetric efficiency $C_{EV}(N_e, Pb)$ for the EGR stop mode for the measured engine speed data $N_e$ and the measured intake pipe pressure data Pb is determined by mapping the two-dimensional map. In step S35, an EGR ratio $K_{EGR}(N_e, Pb)$ for the engine speed data $N_e$ and the intake pipe pressure Pb is determined by mapping the two-dimensional map. In step S36, an EGR correction coefficient $K_{CONT}(\theta)$ for the measured throttle valve opening $\theta$ is determined by mapping the one-dimensional map, which is similar to the one-dimensional map shown in FIG. 5 used in the first embodiment. In step S37, an injector driving time $\tau$ is calculated by substituting the constant K, the intake pipe pressure data Pb, the volumetric efficiency $C_{EV}$, the EGR ratio $K_{EGR}$ and the EGR ration correction coefficient $K_{CONT}$ into a formula (a)

$$\tau = K \times Pb \times C_{EV} \times (1 - K_{EGR} \times K_{CONT}) \qquad (1)$$

After completion step S37, the operation returns to step S30, and then steps S30 to S37 are repeated.

The two-dimensional maps and the one-dimensional map employed for the fuel control operation by the second embodiment may be substituted by functions to determine the factors by calculation.

Thus, the fuel control apparatus in the second embodiment calculates a fuel injection quantity by using a corrected EGR ratio obtained by correcting, according to an actual throttle valve opening, an EGR ratio previously determined so as to meet the operating condition of the engine. Therefore, accurate air-fuel ratio control can be achieved and the deterioration of the exhaust gas and the performance of the engine can be prevented because the corrected EGR ratio approximate to an actual EGR ratio can be calculated regardless of the atmospheric pressure and the bypass air flow rate.

What is claimed is:

1. A fuel control apparatus for an engine, comprising:
   exhaust gas recirculation control means for controlling the rate of recirculation of the exhaust gas to the intake system according to negative pressure varying with the opening of the throttle valve of the engine;
   coefficient calculating means for determining, according to the current operating condition of the engine, a first coefficient for calculating fuel injection quantity for the operation of the engine in an exhaust gas recirculation stop mode in which the exhaust gas is not recirculated and second coefficients for calculating fuel injection quantity for the operation of the engine in an exhaust gas recirculation mode in which the exhaust gas is recirculated; and fuel injection quantity calculating means for calculating fuel injection quantity by using first and second corrected coefficients obtained by correcting the first and second coefficients according to the opening of the throttle valve, and parameters representing the current operating condition of the engine.

2. A fuel control apparatus for an engine according to claim 1, wherein the first and second coefficients for calculating fuel injection quantity are fist and second volumetric efficiencies, respectively, obtained by mapping two-dimensional maps indexed by engine speed data and intake pipe pressure data.

3. A fuel control apparatus for an engine according to claim 1, wherein said fuel injection quantity calculating means includes a one-dimensional map indexed by throttle valve opening and exhaust gas recirculation ratio.

4. A fuel control apparatus for an engine according to claim 2, wherein said first and second volumetric efficiencies are those respectively for the exhaust gas recirculation stop mode and the exhaust gas recirculation mode.

5. A fuel control apparatus for an engine, comprising:
exhaust gas recirculation control means for controlling the rate of supply of the exhaust gas to the intake system according to negative pressure varying with the opening of the throttle valve;

first calculating means for correcting a given exhaust gas recirculating ratio corresponding to an operating mode of the engine with reference to the opening of the throttle valve; and second calculating means for calculating fuel injection quantity by using the corrected exhaust gas recirculation ratio and parameters representing the operating condition of the engine.

6. A fuel control apparatus for an engine according to claim 5, wherein said second-calculating means calculates fuel injection quantity by using intake pipe pressure data, volumetric efficiency for an exhaust gas recirculation stop mode in which the exhaust gas is not recirculated, exhaust gas recirculation ratio and a correction coefficient for correcting exhaust gas recirculation ratio.

* * * * *